United States Patent [19]
Meschter

[11] Patent Number: 6,038,403
[45] Date of Patent: Mar. 14, 2000

[54] SINGLE USE CAMERA EMPLOYING SINGLE FRAME FILM ASSEMBLAGES AND METHOD THEREOF

[75] Inventor: John E. Meschter, Stow, Mass.

[73] Assignee: Polaroid Corporation, Cambridge, Mass.

[21] Appl. No.: 08/829,435

[22] Filed: Mar. 28, 1997

Related U.S. Application Data

[60] Provisional application No. 60/013,745, Mar. 28, 1996.

[51] Int. Cl.⁷ .............................. G03B 17/50; G03B 17/42
[52] U.S. Cl. .................................. 396/30; 396/33; 396/401
[58] Field of Search ............................ 396/6, 30.33, 35, 396/37, 36, 34, 395, 399, 401

[56] References Cited

U.S. PATENT DOCUMENTS

| | | | |
|---|---|---|---|
| 3,289,560 | 12/1966 | Eloranta | 95/13 |
| 3,455,692 | 7/1969 | Bachelder et al. | 96/78 |
| 3,582,335 | 6/1971 | Erlichman | 96/76 |
| 3,804,626 | 4/1974 | Harvey | 96/76 C |
| 4,519,689 | 5/1985 | Kinsman et al. | 354/304 |
| 4,607,926 | 8/1986 | Fichter | 354/78 |
| 4,630,915 | 12/1986 | Whitside et al. | 354/275 |
| 4,855,769 | 8/1989 | Slavitter et al. | 354/21 |
| 5,103,249 | 4/1992 | Keene | 354/85 |
| 5,453,804 | 9/1995 | Norris et al. | 354/83 |
| 5,608,477 | 3/1997 | Shimizu et al. | 396/6 |
| 5,838,999 | 11/1998 | Norris | 396/33 |

*Primary Examiner*—Safet Metjahic
*Assistant Examiner*—Christopher E. Mahoney
*Attorney, Agent, or Firm*—Leslie Payne

[57] ABSTRACT

A camera housing a strip of receiving sheet of self-developable film material; a strip of negative photosensitive film material of the self-developing type having discrete exposable portions spaced apart thereon. A pressure applying assembly e merges the strips into the superimposable relationship to form corresponding separated image forming subassemblies in response to pulling the strips from the camera. The assembly effects release of processing fluid in rupturable containers on the sheet to initiate processing of the film. A device is operative in one mode for allowing pulling of the strips and thereby the formation of an image forming subassemblies through the pressure applying device, and in a second mode for automatically stopping formation and processing of a successive one of the image forming subassemblies. In one embodiment, the device is connected to the shutter unit and is operated when the shutter is actuated.

6 Claims, 5 Drawing Sheets

SINGLE USE CAMERA EMPLOYING SINGLE FRAME FILM ASSEMBLAGES AND METHOD THEREOF

CROSS-REFERENCE TO RELATED PATENT APPLICATIONS

The present application claims the benefit of U.S. Provisional Application No. 60/013,745 filed in the U.S. Patent and Trademark Office on Mar. 28, 1996. The present application is related to copending U.S. patent application Ser. No. 08/549,654, filed in the U.S. Patent and Trademark Office on Oct. 27, 1995, entitled "SINGLE USE CAMERA EMPLOYING SELF-DEVELOPING FILM AND METHOD THEREOF"; as well as copending U.S. patent application (Ser. No. 08/623,018), filed Mar. 28, 1996, and entitled "SINGLE USE CAMERA EMPLOYING SELF-DEVELOPING FILM AND METHOD THEREOF".

BACKGROUND OF THE INVENTION

The present invention relates generally to photographic apparatus, film assemblages, and methods and, in particular, to preferably single use photographic apparatus and methods employing self-developing film.

For reasons of economy and convenience, so-called single use or disposable photographic cameras have gained widespread popularity in recent years. Typically, such cameras when sold contain conventional photographic film ready for exposure. Following film exposure, the camera and film are forwarded to a developer for processing instead of merely the film; as is customarily the case. At the processor, the exposed film is removed from the cameras for processing; while the cameras are not returned to the user but can be discarded. In any event, the photographer must wait until the film is returned from the processor.

Self-developing type cameras employing self-developing film have enjoyed wide spread commercial success because they allow the user to obtain the instant results of their photographic efforts. In general, however, self-developing cameras are dedicated for repeated use. However, because of the appeal of disposable single use cameras, there are continuing efforts to provide the numerous benefits of self-developing film in a single use camera. In this regard, reference is made to commonly assigned U.S. Pat. No. 5,453,804 issued Sep. 26, 1995, that discloses a single use camera for processing self-developing film. While the approach described in this patent is successful, there is nevertheless a continuing desire to devise other approaches for processing self-developing film in the context of single use cameras. For example, another approach in this context is disclosed in U.S. Pat. No. 5,103,249.

SUMMARY OF THE INVENTION

In an illustrated embodiment there is provided a camera for use with a self-developable film assemblage. The camera comprises a housing means including film exiting means through which the film assemblage can emerge from the camera. Included is a first supply means for supplying a strip of receiving sheet of self-developable material having a plurality of discrete and spaced apart image forming portions which are joined together in end-to-end relationship by first intermediate means. Provision is made for a second supply means for supplying a strip of negative photosensitive film material of the self-developing type having discrete exposable portions spaced apart in end-to-end relationship by a second intermediate portion, whereby each of the exposable portions is superimposable with a corresponding one of the image forming portions to form respective independent image forming subassemblies when merged into superposed relationship with each other. The receiving sheet includes processing fluid containing means being operable for releasing processing fluid and being positioned adjacent a leading end portion of each one of the image forming portions and a corresponding trap means located adjacent a trailing end portion of each one the image forming portions. Included is pressure-applying means for merging said strip into a superposable relationship to form respective ones of the subassemblies and for releasing the processing fluid between said strips in response to manual pulling of said strips out of the exit means. In an illustrated embodiment, each of the first and second intermediate means includes means for cooperating with stopping means in the camera. Each of the first and second strips has separable means spaced therealong and in general juxtaposition to the separable means in the other strip. Each of the separable means is oriented generally transversely across a longitudinal extent of the strips and is spaced relative to the image forming subassemblies for allowing separation of an emerged one of the image forming subassemblies from an adjacent one of the image forming subassemblies inside the camera. Provision is made for means selectively operable for stopping each one of the image forming subassemblies for preventing emergence of undeveloped image forming subassemblies from the film exit means after a developed image forming subassembly has been pulled from the exit means.

In an illustrated embodiment of the film assemblage usable with the camera, the separable means of the film assemblage are spaced relative to the trap means, the reservoir means, and the image forming subassemblies for allowing separation of the reservoir means, the image forming subassemblies, and the trap means independently of each other and of the film assemblage; thereby allowing a user to separate a film subassembly from the film assemblage and discard the reservoir and trap means from the image forming area of the subassembly.

In an illustrated embodiment of the film assemblage usable with the camera, the first and second intermediate means includes at least one registration means for cooperating with the stopping means of the camera.

In still another embodiment, the stopping means includes means selectively cooperable with the registration means between operative and inoperative positions, whereby whenever the stopping means is in the operative position, the stopping means cooperates with the cooperating means, and whenever in the inoperative position, the cooperating means is out of cooperation with the registration means.

In another illustrated embodiment, provision is made for a photographic film assemblage of the self-developable type comprising a photosensitive sheet defining an image forming area; trap means adjacent one end portion of the image forming area, and a rupturable fluid containing reservoir adjacent an opposite end portion of the image forming area. In this embodiment, the improvement comprises separable means located intermediate at least the image forming area and the reservoir means for allowing separation of the reservoir from the image forming area.

In another illustrated embodiment, the film assemblage noted above is defined wherein the separation means is located intermediate the trap means and the image forming area for allowing separation of the trap from the image forming area.

Provision is made for a method of obtaining at least a developed film frame of a film assemblage of the self-developing type from a camera, wherein the film assemblage includes a photosensitive sheet defining an image forming area; trap means adjacent one end-portion of the image forming area; a rupturable fluid containing reservoir means adjacent an opposite end portion of the image forming area; and separation means located intermediate at least the image forming area and the reservoir for allowing separation of the reservoir means from the image forming area. Included in the method are the steps of removing the film assemblage from the camera; and at least removing the reservoir means from the image forming area along the separation means.

In an illustrated embodiment of the method, provision is made for the steps of providing the film assemblage with separation means being positioned between the trap and the image forming area so that the trap can be separated from the image forming area.

Still further provision is made for a method of obtaining at least a developed film frame from a film assemblage of the self-developing type from a camera. In this method provision is made for a film assemblage including a photosensitive sheet defining an image forming area, trap means adjacent one longitudinal end portion of the image forming area, and a rupturable fluid reservoir means adjacent an opposite longitudinal end portion of the image forming area. The film assemblage has separable means surrounding at least the image forming area for allowing separation of a developed image forming area from the film assemblage. The method comprises the steps of removing the film assemblage from the camera after the pod has been ruptured; and at least removing the image forming area from the film assemblage along the separation means.

The present invention relates to a camera, preferably of the single use type as well as an improved film assemblage for use therein, wherein the film assemblage is of the self-developing type. In particular, the present invention relates to a camera apparatus comprising a housing assembly having film exiting means; a supply of a receiving sheet material containing thereon in serially spaced apart relationship a pod area, a trap area, and having interposed therebetween, a film image carrying area; as well as a supply of negative sheet material having in serially spaced apart relationship image forming areas. Included is a spreader assembly for applying pressure to each of the first and second film strips so as to bring corresponding superposable image forming and image carrying areas together in intimate relationship with one another to form respective image forming subassemblies and for dispensing and distributing the processing fluid contained within a pod so as to effect diffusion transfer between each of the subassemblies. Also included in the camera is an indexable stopping means or mechanism, cooperating with the film assemblage for stopping the pulling of subsequent undeveloped film assemblages from the camera and thereby ensuring that single frames are dispensed from the camera when a film assemblage is pulled outside the camera. In addition, the stopping means serves to facilitate separation of each of the serially connected film image forming subassemblies.

DETAILED DESCRIPTION

Figure 4:
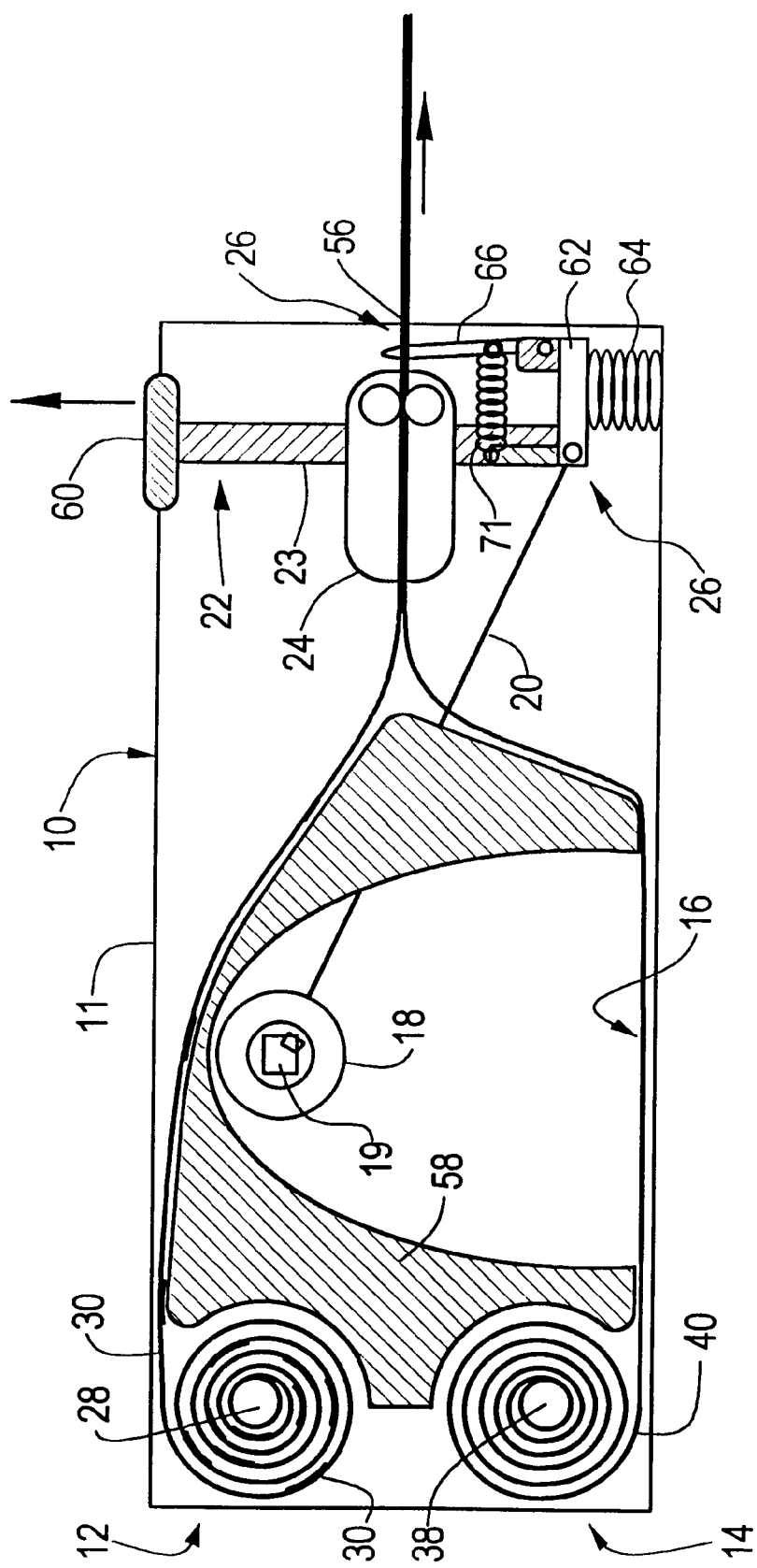
FIG. 4 is a view similar to the FIGS. 1–3 but showing the components in still another configuration during operation.
Figure 5:
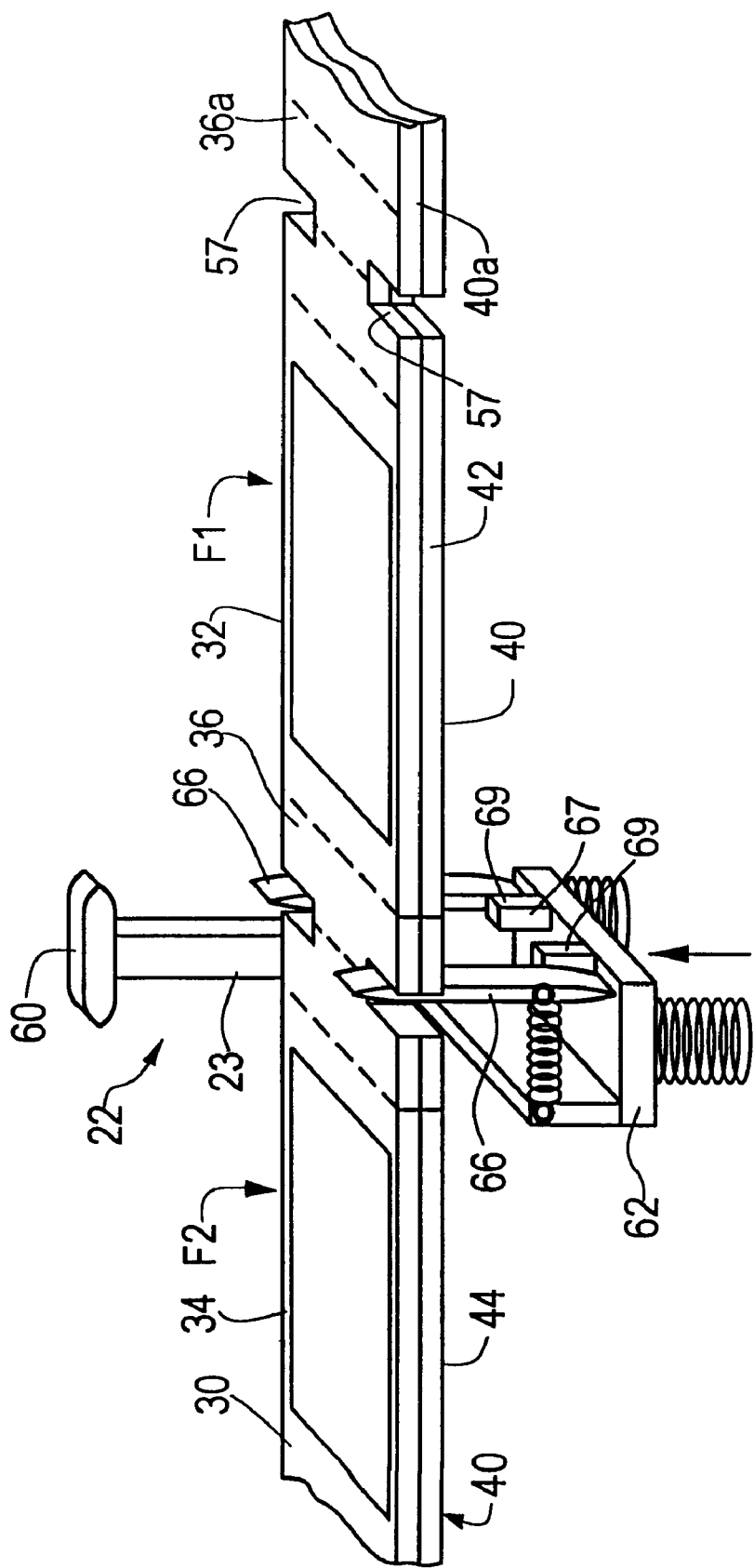
FIG. 5 is an enlarged fragmented view of a component showing the cooperation between the film stopping means and film assemblage of the present invention.
Figure 6:
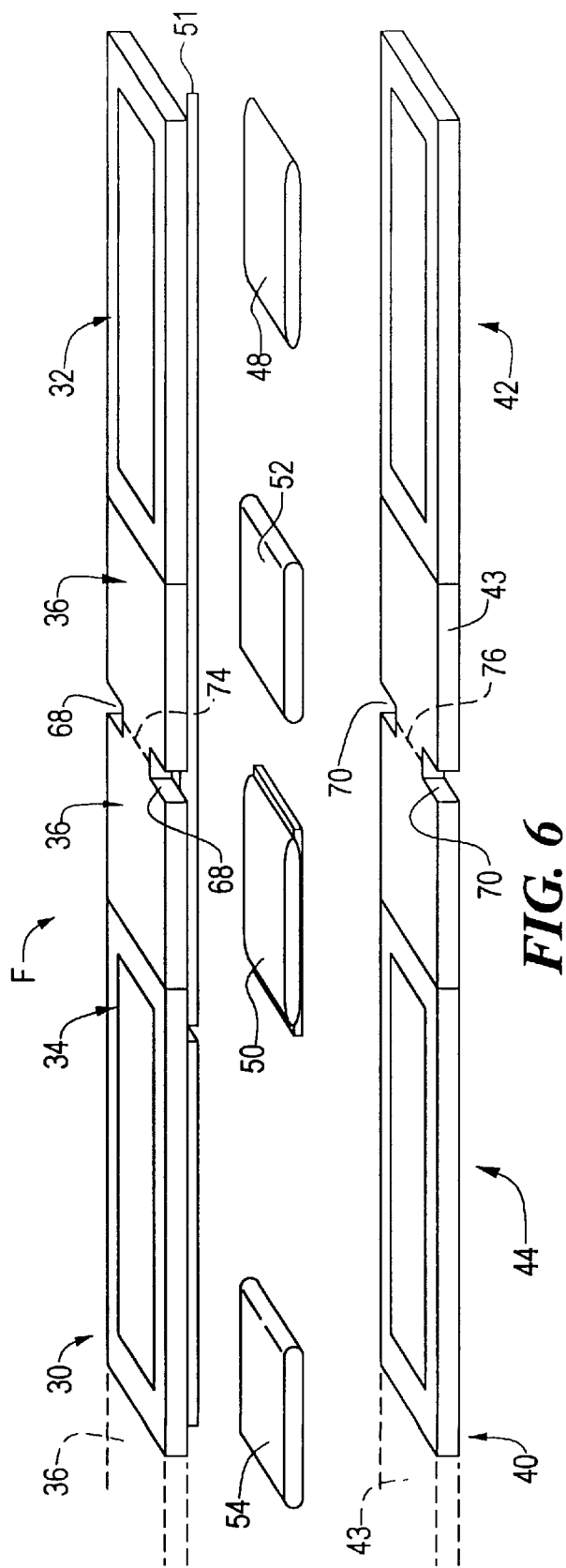
FIG. 6 is an exploded perspective view showing an improved film assemblage made according to the principles of the present invention; and, FIG. 7 is a perspective schematic view of a film subassembly of the self-developing type embodying aspects of the present invention; wherein pod and trap areas are separable.

Reference is initially made to FIGS. 1–5, wherein there is schematically illustrated a photographic apparatus, preferably, a disposable or single use camera represented generally by reference numeral 10 and having a lighttight housing 11. The camera 10 is usable with a film assemblage F of the self-developing type. One preferred embodiment of the film assemblage F construction is shown in FIG. 6. Within the camera 10 is provided structure for receiving first and second supply means 12 and 14; respectively; focal plane 16 within an exposure chamber, taking lens system 18, shutter mechanism 19, shutter link mechanism 20, shutter taking device 22, spread system 24, and indexable film stopping means or mechanism 26. The camera housing 11 can be preferably made of a suitable plastic, cardboard or some other inexpensive material which will provide an inexpensive and lighttight enclosure.

The first supply means 12 includes a rotatable spool 28, having mounted thereon, a strip of coiled receiving sheet material 30 of the self-developing type. As illustrated in FIG. 6, the film assemblage is basically comprised of the receiving sheet and a negative photosensitive sheet of the self-developing type. Examples of this type of film are described in copending patent application Ser. No. 08/549, 654 which description is incorporated herein as a part hereof. In this embodiment, the receiving sheet 30 includes a plurality of discrete and spaced apart image-forming portions 32 and 34. These image forming portions 32, 34 are joined together in an end-to-end relationship by a strip of leader 36; which in the illustrated embodiment is a continuation of the receiving sheet material forming the image forming portions. The second supply means 14 includes a spool 38 having mounted thereon a strip of photosensitive negative sheet film material 40 of the self-developing type. The negative strip of film 40 has formed thereon, a plurality of discrete exposable portions 42, 44 spaced apart in end to end relationship. Each of the exposable portions 42, 44 is adapted to be positioned in superimposable relationship with a corresponding one of the image-forming portions 32, 34 formed on the receiving sheet 30 to form an integral film strip having a plurality of respective image forming subassemblies F1, F2 (FIG. 5). The strip 40 includes a leader or intermediate portion 43 which in this embodiment is a continuation of the negative photosensitive film. It is also intended to have the leader 43 be in intimate engagement with the leader 36 when the strips are merged together to form a separate film unit having a single exposure. While not shown, the present invention contemplates that the leaders instead of being made of the same material can be made of other materials consistent with the principles of the present invention.

Continued reference is made back to the receiving sheet 30 which is seen to include rupturable pods 48, 50 of processing fluid, each located adjacent a leading end portion of the first or leading image forming portion and a corresponding trap means 52, 54 located adjacent each trailing end portion of a respective of the image forming portions 32, 34. The pods are rupturable by the spread roller system and when burst distribute the processing fluid. The preferred processing fluid can ideally be like that described in the last noted patent application which description is incorporated herein by reference as a part hereof. A pair of rails 51, one of which is illustrated, is mounted on the bottom surface of the receiving sheet 30.

With continued reference to the camera 10, it will be seen that the negative sheet 40 is preloaded so that a leading end portion 40a (FIG. 5) is situated with its leading end emerging from an exit slot 56 formed in the camera. The receiving sheet 30 is also preloaded into the camera, with its leading edge 30a (FIG. 5) emerging from the exit slot 56 of the camera. The leading edge portions 30a and 40a define a pair of notches 57, the purpose of which will be described. A view finder (not shown) is provided in the camera and does not form an aspect of the present invention. The camera also includes other structure, such as a mirror (not shown) to allow the image forming light from the taking lens 18 to be directed to the negative at the film plane 16.

The taking lens system 18 directs image-forming rays off a mirror (not shown) onto the focal plane 16 of the negative sheet 40. The housing 11 is formed with a film guiding mechanism 58 for guiding the positive and negative strips as they travel from the respective supply rolls to the spread system 24 having a pair of spread rollers which act to bring the strips into intimate and superposed relationship with each other in a well-known fashion and which act to burst the pods containing the processing fluid. The spread system 24 is like that described in the last noted copending application, which description is incorporated herein as a part hereof. While the guide mechanism 58 has a configuration depicted in FIGS. 1–4, it will be appreciated if a variety of other configurations can be provided for guiding the strips 30, 40 consistent with the teachings of this invention towards the spreader system 24.

The taking shutter device 22 having an actuating post 23 is mounted for vertical reciprocation within the housing 11 and has, having a finger engaging portion 60 located adjacent a top one end for engagement by the operator for effecting the commencement of an exposure cycle. A bottom end portion of the actuating post 23 is connected to a rectangular platform 62 which is spring biased upwardly by a spring 64. Pivotally attached to the platform 62 is the shutter link mechanism 20. The shutter link mechanism 20 is connected to the shutter mechanism 19 of a conventional type.

The indexable film stopping mechanism 26 includes a pair of pawls 66 mounted on opposite ends of a shaft 67 rotatably mounted in a pair of lugs 69 formed on the platform 62. The pawls 66 extend upwardly, as viewed in FIGS. 1–5, such that they are adapted to protrude in an operative position with respective notches 68, 70 formed respectively in the leaders 36 and 43. The pawls 66 are biased by a spring 71 having one end connected the actuating post 23 and the opposite end connected to an upstanding member on the platform 62. The spring 71 biases the pawls inwardly relative to the exit 56 (see FIG. 2), so that when the shutter button is released the pawls do not reengage the notches in the film. The spring 64 is effective to the actuating post 23 and the pawls 66 upwardly so that with respect to the pawls they are brought into registration with this succeeding pair of notches 68,70. It will be appreciated that these pawls effect a stopping of the displacement of the film, whereby an operator cannot further pull the film until another exposure. In this regard, unexposed portions of successive serially arranged image forming subassemblies cannot be pulled from the camera.

Figure 1:
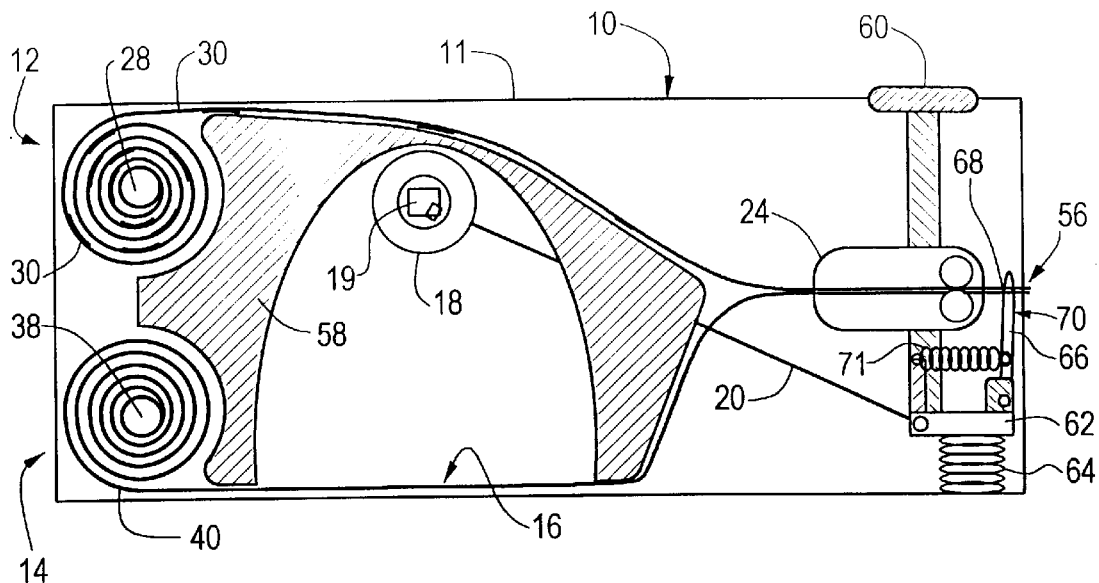
FIG. 1 is a schematic representation of an improved film camera made in accordance with the principles of the present invention.

Reference is made to FIG. 1 for describing one particular operation of the foregoing construction. In the arrangement depicted, the components are in their pre-first exposure condition. Each of the pawls 66 is engaged in notches 68, 70 formed in leading end portion of the first subassembly. The taking device 22 is biased upwardly by the spring 64 and the shutter mechanism 19 is biased and cocked to take an exposure upon downward movement of the actuating post 23.

Figure 2:
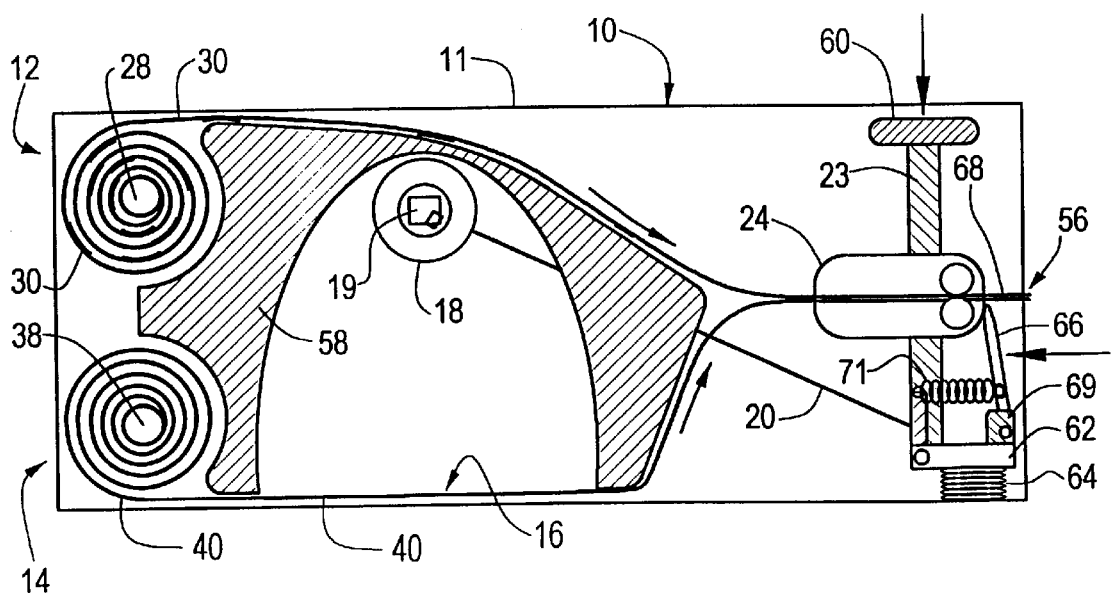
FIG. 2 is a schematic view similar to FIG. 1, but showing the components in a different condition of operation.

FIG. 2 illustrates the effect of downward movement of the post 23 when the user depresses the finger button 60. Such downward displacement will effect operation of the shutter link 20 to commence operation of the shutter 19 in a known manner. Operation of the foregoing shutter operation does not form a part of the present invention. When the operator depresses the taking button 28, the pawls 66 are brought out of cooperation with the film notches 68, 70. As a result, the film assemblage F is free to be pulled by a user, whereby both the strips 30 and 40 will be simultaneously displaced along the predetermined path indicated by the arrows in FIG. 3. As soon as the pawls 66 clear the bottom of the film subassembly, the spring member 71 deflects them towards the spread rollers. This acts to prevent the upward motion of the taking button due to the return force of the spring from pushing the pawls back into the notches. Once the operator pulls on the emerging ends of the first film subassembly F1 including the pod 48, corresponding image forming areas and exposable portions 32, 42, and the trap 52 will sequentially pass through the spread rollers of the spread system 24. This will burst the pod and bring the noted corresponding portions and areas 32, 42 into the desired superimposed condition and effect the diffusion transfer process.

Figure 3:
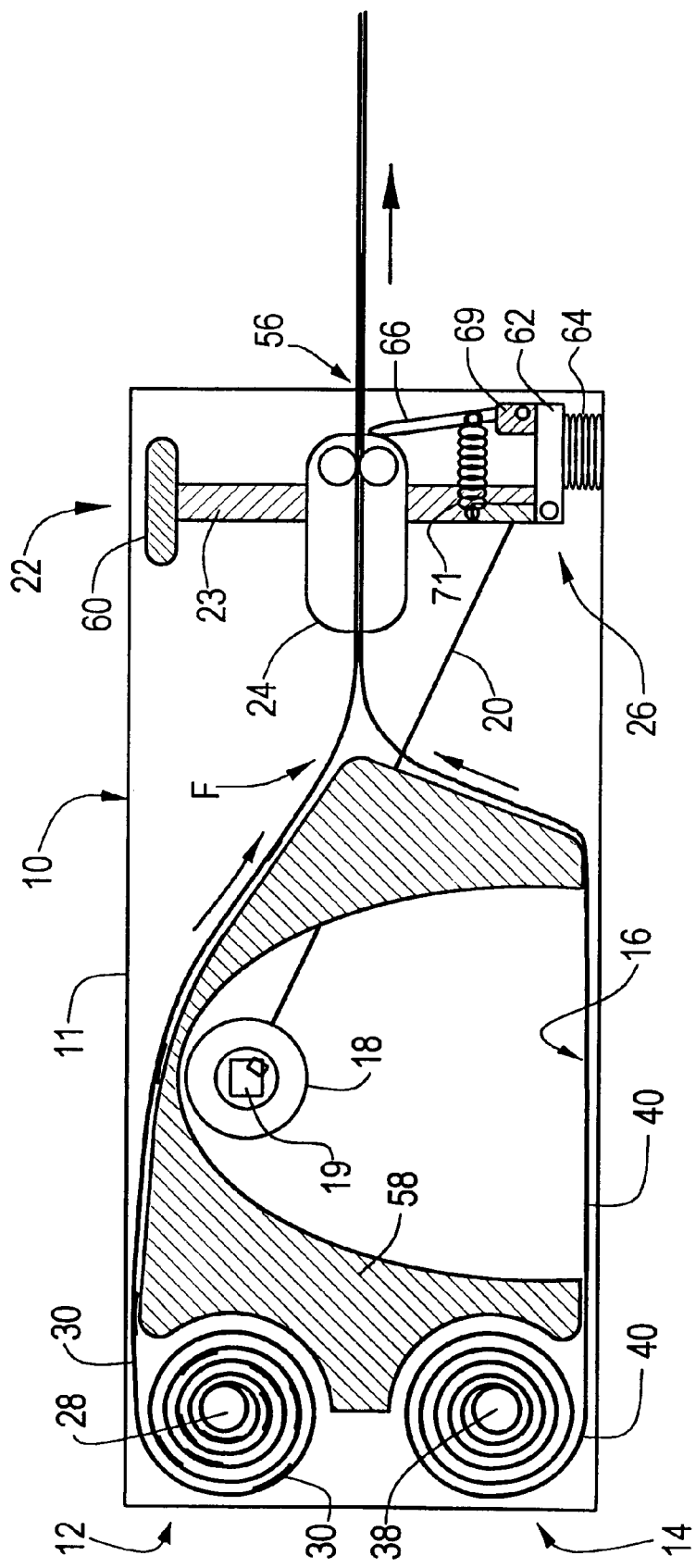
FIG. 3 is a view similar to the above and showing yet another embodiment with the components in a different orientation.

Reference is now made to FIGS. 3 and 4, and as depicted, the biased pawls 66 will, as soon as the next set of cooperating notches or registration holes 68, 70 travel thereover, rise into registration therewith to effect stoppage of the film. As a result, subsequent emergence of the film subassemblies from the camera is prevented. As seen in FIG. 3, the film subassembly has been pulled from the camera, whereby the pod has just passed through the rollers of the spread system and the processing fluid has been spread between the juxtaposed strip portions. As seen in FIG. 4, it will be appreciated that the trap has been pulled through the spread rollers. The pawls 66 engage in the next set of notches and the shutter button returns to the taking position. As a result, the shutter mechanism is recocked in response to displacement of the shutter link. With the pawls in the notches as described, the film movement is stopped. Continued pulling force initiates and completes separation of the frame from the film assemblage within the camera along the perforations which lie between the notches across the receiving sheet and negative. The pawls also act to maintain and retain registration of the sheet and negative.

As seen in FIGS. 5 and 6, each strip is formed with a perforations 74 and 76 in the leaders 36 and 43; respectively. The perforations 74, 76 facilitate the tearing of first subassembly F1 to the second F2. In this regard, after the first subassembly is removed from the camera the user can effect a separation by tearing along the perforations.

Figure 7:
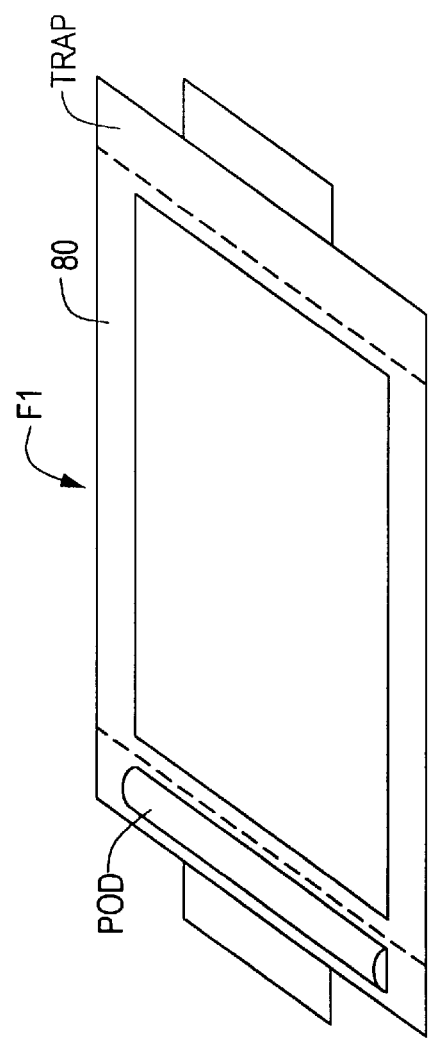

When the pawls no longer encounter resistance by entering the notches the platform 62 raises and forces the actuating post 23 upwardly and allows the shutter link 20 to recock the shutter 19. Accordingly, a single exposure has been effected in a highly reliable and inexpensive manner; whereby a single film unit is dispensed. Because the film assemblage has score lines 76 thereon, it will be appreciated that the pod and trap areas can be removed because of the frangible nature of the score lines so that the resulting subassembly 80 (FIG. 7) is free of pod and trap. Although this embodiment depicts a pair of serially separated image forming subassemblies F1 and F2, it will be appreciated that the principles of the present invention envision a plurality of serially connected image-forming subassemblies, each of which comprises a repeat of the previous constructions.

It will be appreciated that other separable constructions besides score lines and perforations are envisioned by the present invention to effect removal of otherwise joinable portions (e.g. pod and trap). of the strips which are intended to be removed. It is also envisioned that the foregoing strips can be constructed so that the image forming areas can have frangible connections to the film assemblage so that the entire film forming area can be removed from surrounding material of a film assemblage. It is also envisioned that the separate strips can be cowound.

It will be appreciated that the present invention envisions that certain changes may be made to the film assemblages, photographic apparatus and methods without departing from the scope of the invention herein involved, it is intended that all matter contained in the description or shown in the drawings be considered illustrative and not limiting.

What is claimed is:

1. A camera comprising:

housing means including film exiting means;

first supply means for mounting and supplying a strip of receiving sheet of self-developable film material having a plurality of discrete and spaced apart image forming portions which are joined together in end-to-end relationship by first intermediate means;

second supply means for mounting and supplying a strip of negative photosensitive film material of the self-developing type, said negative strip having discrete exposable portions spaced apart in end-to-end relationship by a second intermediate means;

said receiving sheet including processing fluid containing means being operable for releasing processing fluid between the strips in response to pressure applied thereto and being located adjacent a leading end portion of each one of the image forming portions, said sheet further including a trap means located adjacent a trailing end portion of corresponding ones of the image forming portions;

each of said first and second intermediate means including cooperating means for cooperating with film stopping means in said housing;

pressure applying means for merging the strips into a superimposable relationship with each other to thereby form corresponding ones of image forming subassemblies, whereby each of the exposable portions is superimposable with a corresponding one of the image forming portions to form corresponding ones of spaced apart image forming subassemblies when the strips are pulled from said exit means; and, for effecting release of processing fluid from successive ones of said containing means between the strips in response to the pulling of the strips; and, stopping means selectively operable with successive ones of said cooperating means for allowing pulling of a processed image forming subassembly through said pressure applying means and from said film exit means when in a first position, and for automatically stopping the merging and processing of successive ones of the image forming subassemblies by blocking advancement of the strips from said film exit means by cooperating with individual ones of said cooperating means when in the second position;

said stopping means further including a spring biased actuating member which is moved from the second position to the first position in response to an actuating force being applied thereto for actuating a shutter mechanism coupled thereto and thereby commencing an exposure interval.

2. The camera defined in claim 1, wherein said cooperating means comprises at least one registration recess for cooperating with said film stopping means.

3. The camera defined in claim 2, wherein said stopping means includes at least one element that is spring biased and adapted to move into registration with the registration recess in order to block pulling of the strips.

4. The camera defined in claim 1, wherein each of said strips has separable means spaced therealong; each of said separable means on one strip is adapted to be in general juxtaposition to separable means in the other strip; the juxtaposed separable means are spaced relative to said trap means, said containing means, and said image forming subassemblies for allowing separation of said containing means, image forming subassemblies, and said trap means independently of each other and of the image forming assemblies; thereby allowing a user to discard said containing and trap means.

5. The camera defined in claim 1, wherein said first and second intermediate means is comprised of material that interconnects each of said respective image forming portions and exposable portions of said first and second strips; respectively.

6. The camera defined in claim 5, wherein said cooperating means is operatively connected to a shutter means and is movable between said operative and inoperative positions in response to actuation of said shutter means between actuating and non-actuating positions.

* * * * *